Oct. 28, 1969 S. KATZ 3,474,959

FLUID ANALOG CIRCUITS

Original Filed May 26, 1965 3 Sheets-Sheet 1

INVENTOR,
SILAS KATZ

BY Harry M. Saragovitz, Edward J. Kelly, Herbert Berl & J. D. Edgerton
ATTORNEYS

INVENTOR,
SILAS KATZ

BY Harry M. Saragovitz, Edward J. Kelly, Herbert Berl & J. D. Edgerton
ATTORNEYS

INVENTOR,
SILAS KATZ

BY Harry M. Saragovitz, Edward J. Kelly, Herbert Berl & J. D. Edgerton
ATTORNEYS

3,474,959
FLUID ANALOG CIRCUITS

Silas Katz, Silver Spring, Md., assignor to the United States of America as represented by the Secretary of the Army Continuation of application Ser. No. 459,135, May 26, 1965. This application June 19, 1967, Ser. No. 647,893
Int. Cl. G06m 1/12; G06d 1/00; F15c 1/08
U.S. Cl. 235—200 5 Claims

ABSTRACT OF THE DISCLOSURE

A passive difference junction is disclosed having two inputs perpendicular to each other and two outputs, each aligned with an input. A vent to atmosphere is located between the outputs. Two analog signals applied to the inputs will meet in an interaction region. The arithmetic difference will exit through an output, the remainder passing through the vent.

This application is a continuation of Ser. No. 459,135, filed May 26, 1965, now abandoned.

The invention described herein may be manufactured and used by or for the Government of the United States of America for governmental purposes without the payment to me of any royalty thereon.

This invention relates generally to pure fluid systems and more particularly to fluid analog circuits.

Fluid systems, having no moving parts except for the fluid itself, are finding extensive application in the fields of computation and control because of their high degree of reliability when operating under high temperature and radiation conditions, their resistance to shock, their relatively low cost and the ease by which they can be constructed.

In the development of a pure fluid analog computer, one important objective is to develop a fluid operational amplifier without moving parts. The name "operational amplifier," like many other terms used in the field of fluid amplification, is taken from electronics. It is used to designate a high gain directly coupled feedback amplifier. This type of amplifier contains impedances in the input and feedback paths that permit mathematical operations to be performed on an input signal. Thus addition, multiplication by a constant, or scaling, differentiation and integration are accomplished by using the appropriate impedances. An amplifier that performs these operations can be used to solve differential equations. In fact the electronic operational amplifier is the basic component of the electronic analog computer.

The design of a pure fluid operational amplifier can be divided into three separate tasks. First, it is necessary to have a high pressure gain proportional fluid amplifier. Such an amplifier is presently under development. Pressure gains in the neighborhood of 7500 have been obtained in the laboratory by cascading five single stages of amplification. A gain of this magnitude, although far below electronic high gain amplifiers, is suitable for a great many computing applications. The problems that remain in the high pressure gain proportional fluid amplifier are to reduce noise and drift, and to increase bandwidth.

The second task concerns the design of suitable fluid impedances. This is an area that requires much more attention. Of particular interest is the design of a point to point capacitor or a fluid network that behaves like a point to point capacitor. In this connection, the now well-known lock-on principal offers interesting possibilities. At present, components using this principle are being fabricated for experimental purposes.

The third task is the effective use of feedback in the proportional fluid amplifier and involves more than simply indicating feedback on circuit diagrams.

In a typical proportional fluid amplifier, such as described by B. M. Horton in his Patent No. 3,122,165 for Fluid-Operated System, the flow from a power jet at pressure, $P^+$ is partitioned between a left output aperture at output pressure, $P_{ol}$ and a right output aperture at pressure, $P_{or}$. The distribution of the recovered power jet pressure in the outputs is determined by the difference between a left control jet pressure, $P_{cl}$ and a right control jet pressure, $P_{cr}$.

One of the performance criteria of the proportional amplifier is the pressure gain, $G_p$. The pressure gain may be defined as:

$$G_p=\frac{\Delta(P_{ol}-P_{or})}{\Delta(P_{cr}-P_{cl})} \quad (1)$$

If the output pressure difference is plotted against the control pressure difference, the slope of this curve represents the pressure gain of the amplifier. The linear region where the gain is maximum and essentially constant occurs around the position of equal partition of the power jet.

This relation between output pressure difference and control pressure difference would be suitable for use in a feedback amplifier if a fluid signal proportional to the output pressure difference were available for return to the input. Unfortunately, however, this fluid amplifier does not put out a usable pressure difference signal. Instead, it puts out an output pressure on each side from which a difference curve may be computed.

When the control jet pressure difference is zero, each output is at the same pressure. This may be considered as an initial bias. The input to the amplifier, however, cannot accept a bias level of this magnitude. Generally the input control pressure bias level is held between 0 and 20 percent of the power jet pressure. Therefore, in order to use feedback from the output to the input, this bias level must be cancelled out in some way.

Several ways of accomplishing this have been suggested. One way is to place the proportional amplifier inside a pressurized chamber. This effectively raises all the pressures in the amplifier by a fixed amount. The pressure in the chamber serves as a new pressure reference. In this case the atmospheric reference is still available to drop the undeflected outputs through resistors down to the level of the new pressure reference. A phase reversal is therefore obtained. Output signals may fall below the new pressure reference. This offers a considerable advantage in computation. Thus it is possible for pressures above atmospheric to represent negative signals. A disadvantage of this method is that it adds another source of signal variation. If the new pressure reference varies, the relation between input and output also varies. In addition the new reference pressure must be added to all input signals. It appears then, that the new pressure reference must be carefully regulated. At present close regulation can only be accomplished with moving parts.

Another suggestion has been made to remove the initial bias by applying a vacuum source to the output. This, in effect, again creates another pressure reference which must be regulated.

Accordingly, it is therefore an object of this invention to provide a pure fluid component called a passive difference junction that will produce a fluid output signal that is approximately proportional to the output pressure difference signal of a proportional amplifier.

Another object of the invention is to provide pure fluid feedback circuits utilizing proportional amplifier-passive difference junction combinations that have no flow in the feedback loop when no input signal is applied to the proportional amplifier.

A further object of the present invention is to provide a pure fluid scaling circuit that incorporates fluid resistors, a proportional amplifier and a passive difference junction.

Still another object of the instant invention is to provide a pure fluid circuit that will perform integration by having fluid resistors, a fluid capacitor, a proportional amplifier and a passive difference junction.

Yet another object of this invention is to provide a pure fluid circuit incorporating a scaling circuit plus a fluid capacitor that will perform differentiation.

A further object of the invention is to provide pure fluid analog circuits that eliminate many of the passive fluid components on which the computation depends by using passive difference junctions.

According to the present invention, the foregoing and other objects are attained by providing a pure fluid analog circuit wherein the fluid signals from the two output receivers of a high gain proportional amplifier are fed into a passive difference junction to produce a pressure difference output signal that is proportional to the pressure difference between the outputs of the proportional amplifier. This output signal is then fed back through impedances to the controls of the proportional amplifier.

The pressure difference signal is obtained by directing the output streams from the proportional amplifier at right angles to each other in an interaction chamber. A receiver is positioned such that when the streams are equal thereby indicating that no input signal is applied to the controls of the proportional amplifier, no flow is produced in the receiver.

The specific nature of the invention, as well as other objects, aspects, uses and advantages thereof, will clearly appear from the following description and from the accompanying drawing, in which:

FIG. 3(*a*) is a schematic of the electrical analog of the fluid circuit of FIG. 3;

FIG. 4(*a*) is a schematic of the electrical analog of the fluid circuit of FIG. 4.

Figure 1:
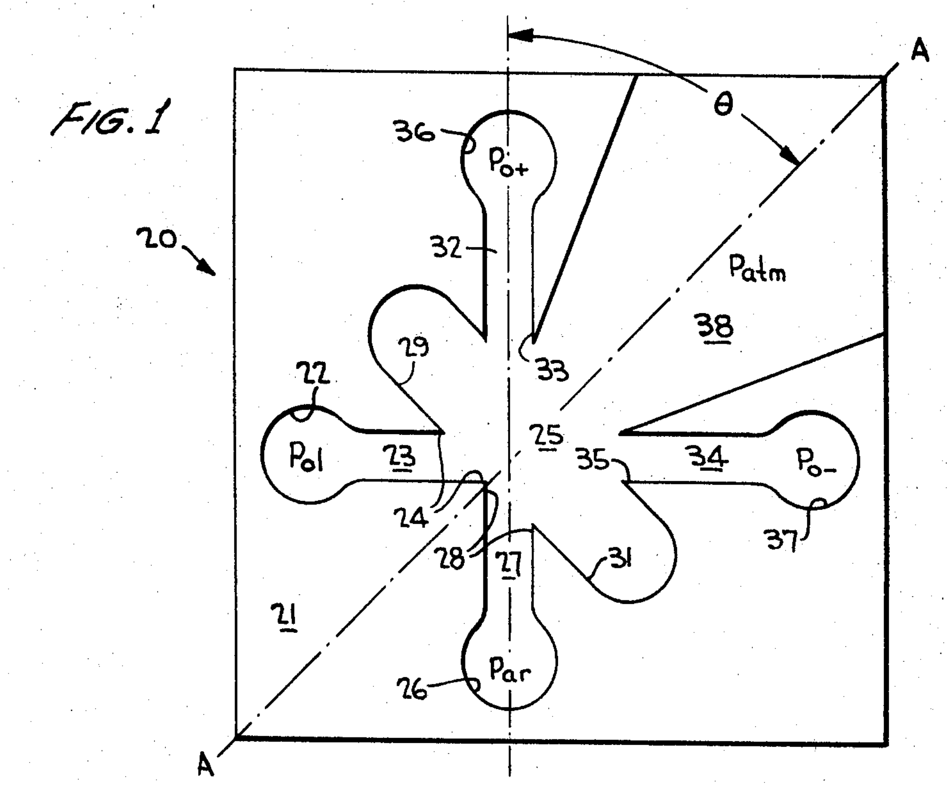
FIG. 1 is a plan view of an embodiment of the passive difference junction constructed according to the instant invention.

Referring now to the drawing wherein like reference characters designate identical or corresponding elements throughout the several views, and more particularly to FIG. 1 whereon a passive difference junction 20 is shown to comprise a pure fluid component that is cut out in a particular configuration to provide fluid passages. The component is typically constructed by forming the arrangement of fluid passages, openings, nozzles, etc. shown, by any suitable manner in a bottom plate 21. A cover plate (not shown) is normally positioned on top of plate 21 in fluid tight relation therewith to confine the fluid in the passages. The plates may be made of any desirable material such as plastic, glass or metal and the fluid passages may be cut by machining, etching, molding, etc. Fluid entering the component through a left opening 22 and a left input passage 23 issues as a stream from a left input orifice or nozzle 24 into an interaction chamber 25. Fluid entering the component through a right opening 26, and a right input passage 27, issues as a stream from a right input orifice or nozzle 28 also into interaction chamber 25. Input passages 23 and 27 are preferably arranged to be at right angles to each other and symmetrical about an axis A–A. The boundary walls 29 and 31 of interaction chamber 25 are set-back sufficiently from the input nozzles 24 and 28 to obviate the wall effects of boundary layer lock-on. A left output receiver 32 with receiving aperture 33 is in alignment with right input passage 27 and a right output receiver 34 with receiving aperture 35 is in alignment with left input passage 23. Fluid flowing in these receivers leaves the junction 20 via left output opening 36 and right output opening 37. A dump channel 38 provides fluid communication between the interaction chamber 25 and the ambient condition and is located so that its centerline (not shown) is coincident with axis A–A.

In the operation of the passive difference junction 20, the inputs are connected to the output of the final stage of amplification of a high gain proportional amplifier (not shown). The fluid pressures at the left and right inputs are shown as $P_{ol}$ and $P_{or}$, respectively for total pressure at the left output and total pressure at the right output. When the left control pressure $P_{cl}$ and the right control pressure $P_{cr}$ of the amplifier are equal, $P_{ol}$ and $P_{or}$, are equal. The stream resulting from the interaction of the streams issuing from nozzles 24 and 28, deflects at a 45 degree angle and exhausts via dump 38 which is shown at atmospheric pressure, $P_{atm}$. No pressure is therefore recovered in the output, receivers 32 and 34. As the left control pressure of the proportional amplifier is increased, the right output pressure is increased while the left output pressure is reduced. Part of the resulting stream impinges on one output aperture. This part comes from the reduced output side. However, even, though this value is decreasing the directed angle $\theta$ is increasing by almost the same amount. This results in an output pressure that is approximately proportional to the difference between the right and left output pressures of the proportional amplifier.

When the output receivers are placed close to the nozzle exits the effects of entrainment are minimized. In this case the flow is considered inviscid. When $P_{cl}>P_{cr}$ the fluid enters the left output receiver designated $P_o+$. Conversely, when $P_{cl}<P_{cr}$ the fluid enters the receiver designated $P_o-$.

In an amplifier there are two possible types of feedback. When part of the output is fed back to the input in phase with the input signal, the feedback is called positive feedback. Conversely, when the portion fed back is out of phase with the input signal the feedback is called negative feedback. Positive feedback causes an increase in gain and possibly results in oscillation. Negative feedback, on the other hand, causes a decrease in gain but acts to reduce the noise generated inside the amplifier. Since reactances are present in any amplifier the phase of the feedback may change for certain operating frequencies. Thus negative feedback may become positive feedback at a particular frequency.

Since operational amplifiers use negative feedback, this is the only type of feedback that is presently considered. Negative feedback is obtained in the case of the proportional fluid amplifier terminated by a passive difference junction by returning the positive output, $P_o+$, to the negative control side of the proportional amplifier, that is, to the control side opposite the input signal. This effectively subtracts the feedback signal from the input signal.

In the circuits to be discussed below, a modified passive difference junction is utilized which has only the left output receiver 32 positioned downstream of the intersection of the input streams to collect the fluid. The output signal thus produced, designated $P_o$ for clarity, is related to the individual outputs of the proportional amplifier by $$P_{ol}-P_{or}=KP_o,\ P_{ol}>P_{or}\ \text{with}\ P_{cl}>P_{cr}$$
$$O=KP_o,\ P_{ol}\geq P_{or} \qquad (2)$$

where $P_o$=total output pressure of the passive difference junction and K=proportionality constant.

Ordinarily proportional fluid amplifiers are designed to be symmetrical; however, at present, fabricating techniques are not sufficiently advanced to insure symmetry in high-gain amplifiers. When amplifiers are not symmetrical, then the controls are not equally effective in deflecting the power jet and a right-side pressure gain, $G_{pr}$ and a left-side pressure gain, $G_{pl}$ are produced. From this it can be shown that $$\Delta(P_{ol}-P_{or})=G_{pr}\Delta P_{cr}-G_{pl}\Delta P_{cl} \quad (3)$$

and relating back to the output signal $P_o$ of the difference junction as expressed in terms of the proportional amplifier outputs in Equation 2, the expression for the output of the difference junction may be written in terms of the proportional amplifier control pressures as $$K\Delta P_o=G_{pr}\Delta P_{cr}-G_{pl}\Delta P_{cl} \quad (4)$$

Finally in the range of linear operation, the difference symbol $\Delta$ may be dropped and Equation 4 becomes $$KP_o=G_{pr}P_{cr}-G_{pl}P_{cl} \quad (5)$$

Figure 2:
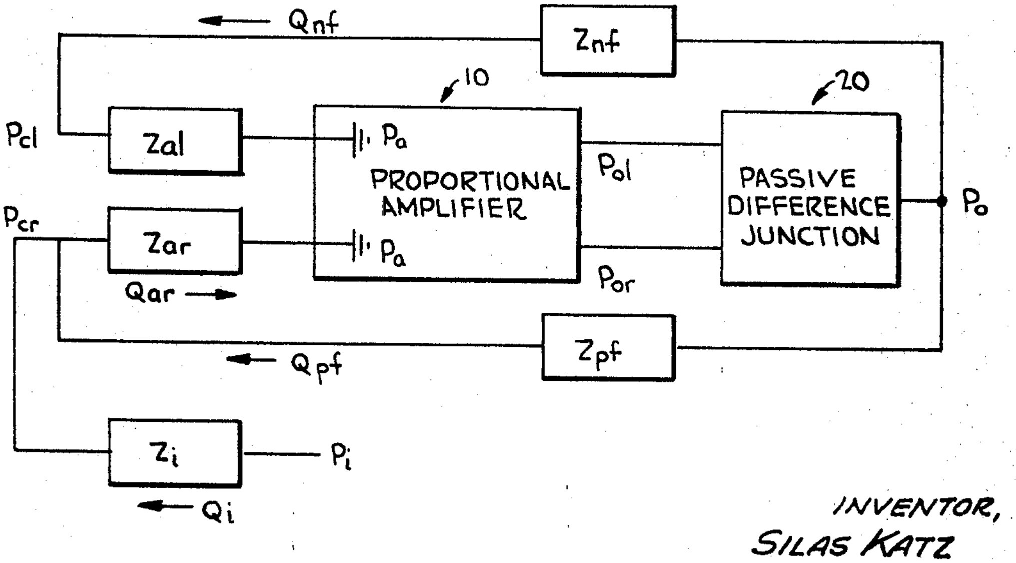
FIG. 2 is a block diagram of a generalized analog fluid circuit in accordance with the principles of the invention.

Turing now to FIG. 2, a high gain proportional amplifier, 10 with left and right input impedances, $Z_{al}$ and $Z_{ar}$ respectively, is connected to a passive difference junction 20. The output of the difference junction, $P_o$ is connected back to the inputs of proportional amplifier 10 through a positive feedback impedance, $Z_{pf}$, and a negative feedback impedance, $Z_{nf}$. The fluid signal to the circuit is applied to one input of the proportional amplifier 10 through a forward loop impedance, $Z_i$. In this circuit, all impedances are considered lumped and the passive elements are assumed to be linear.

This circuit can be analyzed using the continuity equation for incompressible flow. Thus $$Q_{pf}+Q_i=Q_{ar} \quad (6)$$

where $Q_{pf}$=positive feedback volume flow, $Q_i$=input volume flow, and $Q_{ar}$=amplifier right input volume flow. With the impedances assumed linear, the continuity Equation 6 can be written in terms of pressure as $$\frac{P_i-P_{cr}}{Z_i}+\frac{P_o-P_{cr}}{Z_{pf}}=\frac{P_{cr}}{Z_{ar}} \quad (7)$$

where $P_i$=input pressure signal, $P_{cr}$=total pressure at right control and $P_o$=output pressure of the junction 20.

In the negative feedback loop, the feedback impedance $Z_{nf}$ and the amplifier left-input impedance $Z_{al}$ are in series. The flow in this loop is given by $$Q_{nf}=\frac{P_o-P_{cl}}{Z_{nf}}=\frac{P_{cl}}{Z_{al}} \quad (8)$$

where $P_{cl}$=total pressure at left control. If the left control pressure $P_{cl}$ is eliminated between Equations 5 and 8 the result is $$P_{or}=P_o\left[\frac{G_{pl}}{G_{pr}}\left(\frac{Z_{al}}{Z_{al}+Z_{nf}}\right)+\frac{K}{G_{pr}}\right] \quad (9)$$

and the substitution of Equation 9 into Equation 7 gives $$\frac{P_o}{P_i}=\frac{1}{Z_i\left[\left(\frac{K}{G_{pr}}+\frac{G_{pl}}{G_{pr}}\frac{Z_{al}}{Z_{al}+Z_{nf}}\right)\left(\frac{1}{Z_i}+\frac{1}{Z_{pf}}+\frac{1}{Z_{ar}}\right)-\frac{1}{Z_{pf}}\right]} \quad (10)$$

It is therefore seen that the passive difference junction used in conjunction with an asymmetrical proportional amplifier gives zero output for a zero input. This is in contrast to the non-zero output of an asymmetrical amplifier with feedback which adversely affects its use in computational circuits.

Figure 3:
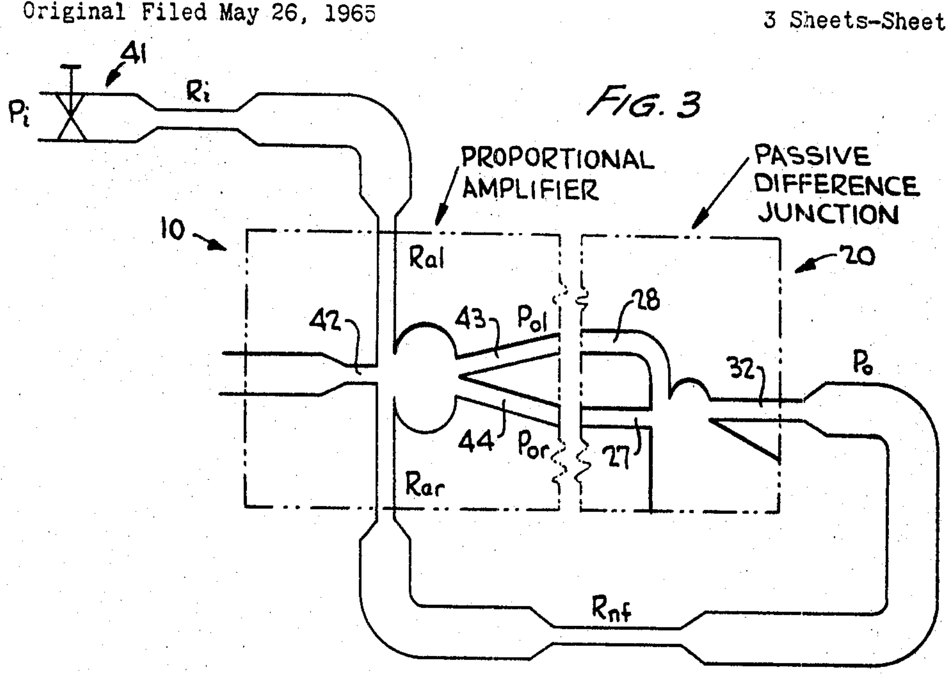
FIG. 3 is a representation of a fluid scaling circuit employing a modification of the component of FIG. 1.
Figure 3A:
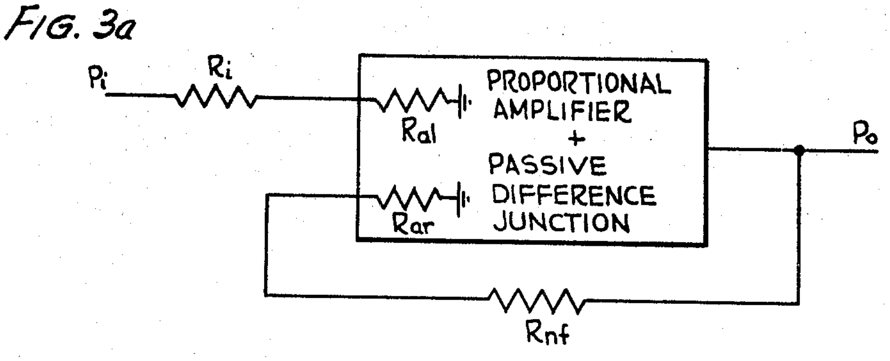

FIG. 3 shows an arrangement of fluid components to perform scaling or multiplication by a constant. This circuit includes fluid resistors, which can take the form of a nesting of capillary tubes for examples, a high gain proportional amplifier, and a passive difference junction. A fluid control signal $P_i$, regulated by a control means 41 passes through an input resistor $R_i$ and a left input resistor $R_{al}$ and influences a power jet stream issuing from nozzle 42 as it divides between the left and right outputs 43 and 44 respectively of proportional amplifier 10. The output signals represented as left output $P_{ol}$ and right output $P_{or}$ enter the passive difference junction 20 as fluid streams and interact with one another to produce a pressure difference output signal $P_o$ in receiver 32. Pressure difference signal $P_o$ is then fed back to the right control through negative feedback loop resistor $R_{nf}$ and right input resistor $R_{ar}$.

The electrical analog of the fluid circuit of FIG. 3, is diagrammed in FIG. 3(*a*), which is equivalent to the generalized feedback circuit of FIG. 2 with infinite positive feedback impedance ($z_{pf}=\infty$). The ratio of output pressure $P_o$ to input pressure, $P_i$, is obtained from Equation 10 by substituting the resistances shown for the unknown impedances. This yields $$\frac{P_o}{P_i}+\frac{R_{nf}+R_{al}}{R_i+R_{ar}}\left[\frac{1}{\left(\frac{K}{G_{pr}}\right)\frac{R_{al}+R_{nf}}{R_{ar}}+\left(\frac{G_{pl}}{G_{pr}}\right)\frac{R_{al}}{R_{ar}}}\right] \quad (11)$$

By assuming a symmetrical amplifier, Equation 11 then reduces to $$\frac{P_o}{P_i}=\frac{R_{nf}+R_A}{R_i+R_A} \quad (12)$$

where $$R_A=R_{al}=R_{ar}, \text{ and } G_p\gg\frac{K(R_{nf}+R_{al})}{R_{al}}$$

Figure 4:
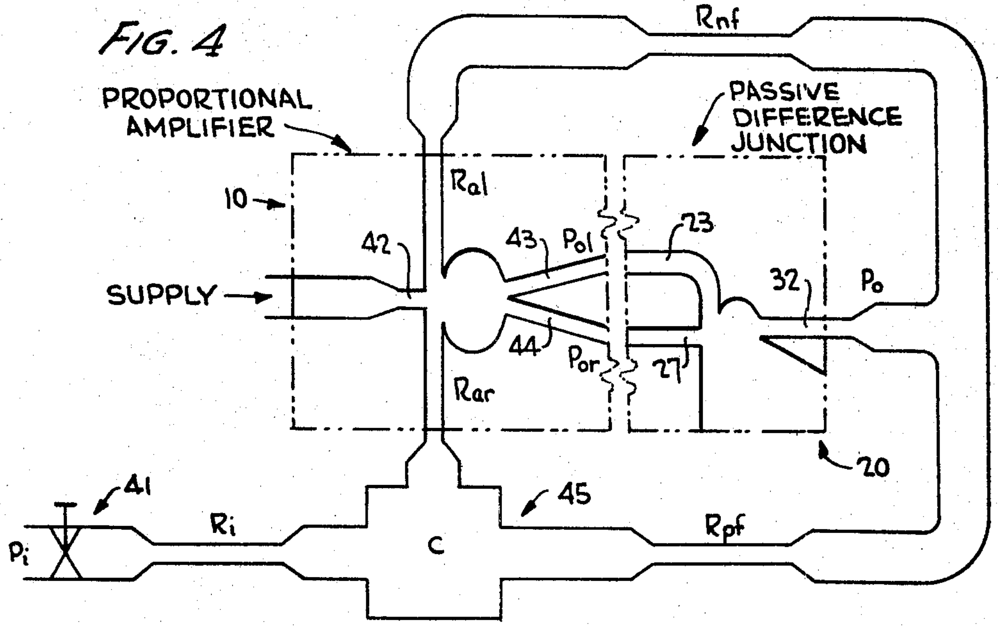
FIG. 4 is a representation of a fluid integrator circuit employing a modification of the component of FIG. 1.
Figure 4A:
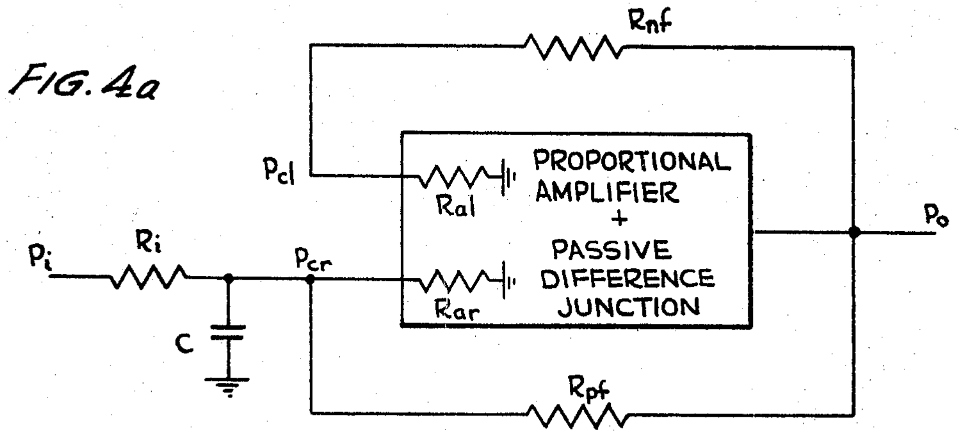

The fluid circuit of FIG. 4 is termed a "bootstrap" integrator and is one type of circuit utilizing a proportional amplifier-passive difference junction combination to perform integration. In this circuit, the output pressure difference signal $P_o$ of junction 20 is fed back to the left control of amplifier 10 via a negative feedback loop resistor $R_{nf}$ and a left control input resistor $R_{al}$. $P_o$ is fed back to the right control to combine with the input signal $P_i$ via positive feedback loop resistor $R_{pf}$, a capacitor C which may be a tank 45, and a right control input resistor $R_{ar}$. In this integrator, regenerative or positive feedback is used to boost the pressure in the tank 45 by an amount equal to the difference between true integration and RC integration.

The electrical analog of the integrator circuit is shown in FIG. 4(*a*). The impedances in the circuit of FIG. 2 are replaced by resistors except for one amplifier input impedance (either right or left). This input impedance is replaced by the parallel combination of a resistor $R_{pf}$ and a capacitor C to ground. This is expressed mathematically as $$Z_{ar}=\frac{R_{ar}}{R_{ar}C+1} \quad (13)$$

Substituting Equation 13 into equation 10 and changing the other impedances into resistances yields $$\frac{P_o}{P_i}=\frac{1}{R_iC\left[\frac{K}{G_{pr}}+\frac{R_{al}}{R_{al}+R_{nf}}\frac{G_{pl}}{G_{pr}}\right]+\left[\left(\frac{K}{G_{pr}}+\frac{G_{pl}}{G_{pr}}\frac{R_{al}}{R_{al}+R_{nf}}\right)\left(1+\frac{R_i}{R_{pf}}+\frac{R_i}{R_{ar}}\right)-\frac{R_i}{R_{pf}}\right]} \quad (14)$$

When the input pressure, $P_i$ is a step function, the solution of Equation 14 is $$\frac{P_o}{P_i}=\frac{1}{B}\left[1-E^{\frac{-Bt}{\tau}}\right]=\frac{t}{\tau}-\frac{B}{2}\left(\frac{t}{\tau}\right)^2+\frac{B^2}{6}\left(\frac{t}{\tau}\right)^3-\dots \quad (15)$$

where $$B=\left[\left(\frac{K}{G_{pr}}+\frac{R_{al}}{R_{al}+R_{nf}}\frac{G_{pl}}{G_{pr}}\right)\left(1+\frac{R_i}{R_{pf}}+\frac{R_i}{R_{ar}}\right)-\frac{R_i}{R_{pf}}\right]$$

and $$\tau=R_iC\left[\frac{K}{G_{pr}}+\frac{R_{al}}{R_{al}+R_{nf}}\frac{G_{pl}}{G_{pr}}\right]$$

When $B=0$, true integration results. Positive values of B are an indication that there is not enough positive feedback and negative values of B indicate an excess of positive feedback. The resistances can always be adjusted so that B is zero as long as an active component with positive forward loop pressure gain greater than unity is available. Without this active component a physically unrealizable negative resistive component would be required. With the assumption of a high gain symmetrical amplifier, Equation 14 becomes $$\frac{P_o}{P_i}=\frac{1}{R_iC}\frac{R_{al}+R_{nf}}{R_{al}} \quad (16)$$

when the resistances are adjusted to make B equal to zero. Equation 16 can then be shown to yield $$P_o=K\int P_i dt \quad (17)$$

Figure 5:
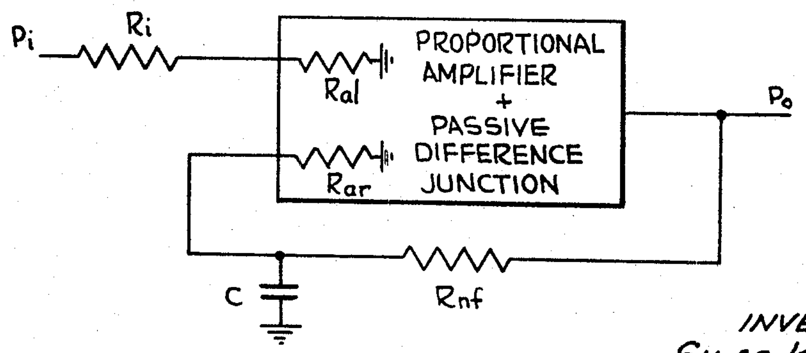
FIG. 5 is a schematic of the electrical analog of a fluid differentiator circuit (not shown) according to the teachings of the invention.

FIG. 5 shows a circuit that is used to obtain a scale change plus rate or a differentiation. Only the electrical analog of the fluid circuit is shown since this circuit is substantially the same as the scaling circuit of FIG. 3(*a*) with a tank added in the feedback path. If as in Equation 12, $R_{al}=R_{ar}=R_A$, it can be shown that $$P_o=\left(\frac{R_{nf}+R_A}{R_i+R_A}\right)P_i+R_{nf}C\left(\frac{R_A}{R_A+R_i}\right)\frac{dP_i}{dt} \quad (18)$$

which indicates that the output pressure is a function of the input pressure plus the rate of change of the input pressure.

The dynamic performance of the components in the circuits described above have not been mentioned because of the complexities that are involved.

It will be apparent that the embodiments shown are only exemplary and that various modifications can be made in construction and arrangement within the scope of the invention.

The claims of this continuation application are as follows:

1. A pure fluid component for producing a pressure difference signal comprising:
(a) first nozzle means for issuing a first stream of fluid in response to a first fluid input signal,
(b) second nozzle means positioned perpendicular to said first nozzle means to issue a second stream of fluid into said first stream of fluid and at right angles thereto,
(c) interaction chamber means downstream of said first and second nozzle means for receiving said first and second fluid streams,
(d) said chamber means having boundary walls set back from said first and second nozzle means to prevent lock-on effects, (e) first output receiver means in linear alignment with said first nozzle means,
(f) second output receiver means in alignment with said second nozzle means, and
(g) a vent symmetrically positioned between said first and second output receivers.

2. The component according to claim 1 in combination with:
(a) a high-grain proportional fluid amplifier having two controls and two outputs, said outputs connected to said first and second nozzle means respectively of said component,
(b) a negative feedback path having fluid impedance therein connected between the output of said component and a control of said amplifier,
(c) a positive feedback path having fluid impedance therein connected between the output signal of said fluid component and the other control of said amplifier, and
(d) means for applying an input signal to one of said amplifier controls through a forward loop impedance,
(e) whereby a mathematical computation is performed on said input signal, the character of the computation being determined by the character of said impedances.

3. The invention according to claim 2, wherein:
(a) said positive feedback path has infinite impedance,
(b) said negative feedback impedance and said forward loop impedance are fluid resistances,
(c) said input signal is introduced into one control of said amplifier, and
(d) the fluid signal produced by said negative feedback path is introduced into the other control of said amplifier,
(e) whereby said circuit performs multiplication by a constant.

4. The invention according to claim 2, wherein:
(a) said positive feedback path has infinite impedance,
(b) said negative feedback path comprises a fluid resistance and a fluid capacitance,
(c) said input signal is introduced into one control of said amplifier, and
(d) the fluid signal produced by said negative feedback path is introduced into the other control of said amplifier,
(e) whereby said circuit performs differentiation.

5. The invention according to claim 2 wherein:
(a) said negative feedback impedance is essentially resistive,
(b) said positive feedback impedance comprises a fluid resistance and a fluid capacitance,
(c) said forward loop impedance is essentially resistive, and
(d) said input signal and the fluid signal produced in said positive feedback path are introduced into said amplifier through the same control, whereby
(e) said circuit performs integration.

References Cited

UNITED STATES PATENTS 3,238,959 3/1966 Bowles ............ 137—81.5

RICHARD B. WILKINSON, Primary Examiner

LAWRENCE R. FRANKLIN, Assistant Examiner

U.S. Cl. X.R.

137—81.5

PO-1050
(5/69)

UNITED STATES PATENT OFFICE
CERTIFICATE OF CORRECTION

Patent No. 3,474,959 Dated October 28, 1969

Inventor(s) Silas Katz

It is certified that error appears in the above-identified patent and that said Letters Patent are hereby corrected as shown below:

Column 8, line 9, change "high-grain" to -- high-gain --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents